United States Patent [19]

Bräutigam et al.

[11] 4,443,835
[45] Apr. 17, 1984

[54] APPARATUS FOR CREATING AN EVEN ILLUMINATION OF A PLURALITY OF TITLE BLOCKS

[75] Inventors: Rolf Bräutigam, Markt; Jurgen Wesemeyer, Nuremberg; Hartmut Zöbl, Furth, all of Fed. Rep. of Germany

[73] Assignee: Robert Bosch GmbH, Stuttgart, Fed. Rep. of Germany

[21] Appl. No.: 297,826

[22] Filed: Aug. 31, 1981

[30] Foreign Application Priority Data

Sep. 3, 1980 [DE] Fed. Rep. of Germany ....... 3033096

[51] Int. Cl.³ .............................................. F21V 7/00
[52] U.S. Cl. ..................................... 362/300; 40/579; 362/301; 362/307; 362/310; 362/311; 362/351; 362/362; 362/375; 362/812; 362/30
[58] Field of Search ................ 362/30, 300, 301, 307, 362/310, 311, 351, 362, 375, 812; 40/579

[56] References Cited

U.S. PATENT DOCUMENTS

| | | | |
|---|---|---|---|
| 3,241,256 | 3/1966 | Viret et al. | 362/30 X |
| 3,599,596 | 8/1971 | Remus et al. | 40/579 |
| 4,048,739 | 9/1977 | Benton | 40/579 |

Primary Examiner—Stephen J. Lechert, Jr.
Attorney, Agent, or Firm—Frishauf, Holtz, Goodman, Woodward

[57] ABSTRACT

A diaphragm having a plurality of apertures each associated with a title block on the front panel of an indicator unit is provided to cause the various title blocks to be illuminated evenly from a light source positioned behind the diaphragm. The size, number and shape of the apertures is so chosen that all of the title blocks are equally illuminated regardless of their size and regardless of their distance to the light source. Indirect light is used to prevent the formation of shadows and light spots on the title blocks.

16 Claims, 3 Drawing Figures

APPARATUS FOR CREATING AN EVEN ILLUMINATION OF A PLURALITY OF TITLE BLOCKS

The present invention relates to apparatus for equally and evenly illuminating a plurality of title blocks on the front panel of a housing for a lamp, particularly an indicator panel for a motor vehicle. Specifically, light from a light source positioned in the housing shines through the text of the title block so that it is clearly visible on the front panel.

BACKGROUND

An even illumination of the above described type is achieved in well known apparatus by utilization of one or more light sources whose light is then rerouted by prisms. In other apparatus, the title blocks are evenly illuminated by the use of optical fibers which transmit light from the light source to the title blocks. Equal and even illumination can also be achieved by applying lacquers of different light transmissivity to the front panel or, alternatively, applying a plurality of layers of the same lacquer. This allows an even illumination of all title blocks of the front panel to be achieved even though relatively few point sources of light, for example incandescent lamps, are utilized. However, all of these known systems have various drawbacks. Prisms and optical fibers must be fastened between the light source and the title blocks in such a way that they are resistant to vibration and shock. The lacquer applied to front panels in the other systems tends to darken as time progresses, thereby preventing the desired even illumination of all title blocks.

The Invention

It is an object of the present invention to achieve an even illumination of all of the title blocks in a simple manner. The apparatus for achieving the even illumination is to be relatively inexpensive and is to be resistant to vibration and shock.

In accordance with the present invention a diaphragm is arranged between the light source and the front panel. The diaphragm has apertures in the region of the title blocks, the size and/or number of the apertures increasing with the size of the title block to be illuminated thereby as well as with the distance of the light source from that title block.

In a preferred embodiment, the diaphragm has a light-reflecting surface facing the light source. A second light-reflecting surface facing the above-mentioned light-reflecting surface cooperates therewith to prevent shadows and intense light spots from interfering with the observer's ability to read the information in the title blocks.

DRAWINGS ILLUSTRATING A PREFERRED EMBODIMENT

FIG. illustrates the front panel of an indicator or display device having a plurality of title blocks;

DESCRIPTION OF THE PREFERRED EMBODIMENTS

Figure 1:
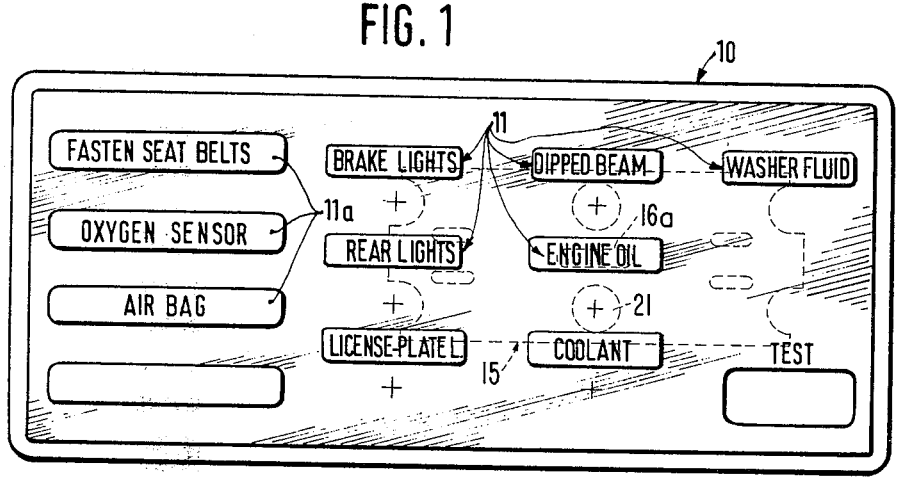

In FIG. 1, reference numeral 10 denotes the front panel of an indicator unit for a motor vehicle. A plurality of title blocks are arranged next to and underneath each other on the front panel. The title blocks provide the driver with information about the then-present condition or functioning of the various units in the motor vehicle. Front panel 10 is transparent and with the exception of the title blocks 11, is covered with a black layer. An incandescent lamp 13, forming an essentially point source of light is arranged within the housing of the indicator unit 12 for illuminating title blocks 11. The leftmost title blocks 11a are separated by a partition 14 from the remaining title blocks 11. The latter are to be illuminated by an incandescent lamp 13. Title blocks 11a are to be directly illuminated by an incandescent lamp (not shown).

A diaphragm 15 is arranged between incandescent lamp 13 and front panel 10. Diaphragm 15 has apertures 16 in the region of the title blocks 11. The size of and/or the number of the openings 16, that is, the free area of the openings available for light transmission to an associated title block, is determined first, by the size of the title block 11 to be illuminated thereby and, secondly, by the distance of incandescent lamp 13 to the title block. When the title block is further away from incandescent lamp 13, the number or the size of the openings increases. The output of the incandescent lamp must be sufficient that even those title blocks 11 which are furthest away from the incandescent lamp are still clearly visible. Diaphragm 15 keeps sufficient light from title blocks 11 which are close to incandescent lamp 13, so that all title blocks 11 are illuminated to the same extent. The light reflecting surface 17 on the side of diaphragm 15 which faces incandescent lamp 13 prevents the formation of shadows or excessively highly illuminated regions in the area of title blocks 11. A second light-reflecting surface 18 is arranged at a predetermined distance to surface 17 of diaphragm 15. The light-reflecting surface 18 is part of a printed circuit board 19 arranged in housing 12a of indicator unit 12. Incandescent lamp 13 is fastened in the printed circuit board and the light source is thus positioned between the two light reflecting surfaces 17 and 18. Diaphragm 15 is fastened to projections 20 on the back of front panel 10. The diaphragm as well as the printed circuit board 19, are arranged in a direction parallel to front panel 10, the diaphragm being arranged midway between the front panel and the incandescent lamp.

Figure 2:
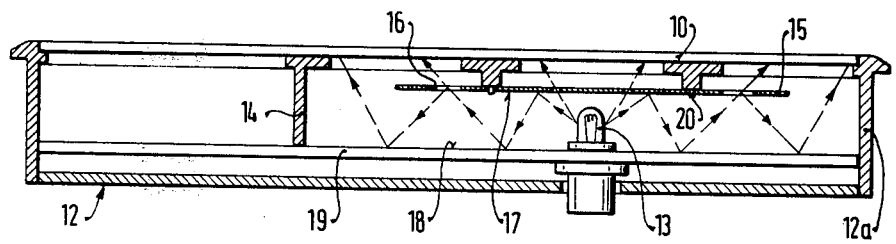
FIG. 2 is a cross section through the apparatus of FIG. 1.
Figure 3:
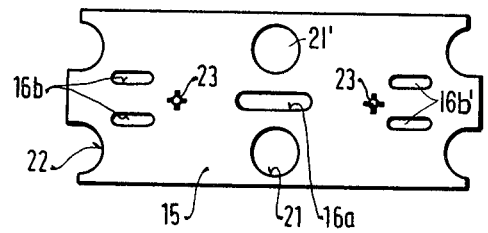
FIG. 3 illustrates the diaphragm to be arranged behind the front panel.

FIG. 3 is a top view of diaphragm 15. Light-emitting diodes are arranged in holes 21 and recesses 22. Each of the light-emitting diodes is assigned to one of the title blocks 11 and, when lit, indicates a malfunction associated with the displayed entity. Each light-emitting diode (not shown in FIG. 2) is positioned below the respective title block 11, its light being clearly visible from the front by contrast to the black color of front panel 10.

Diaphragm 15 is both narrower and shorter than the field formed by title blocks 11 so that portions of all title blocks 11 other than the central title block "ENGINE OIL" are directly exposed to indirect light from lamp 13. The indirect lighting prevents the formation of shadows. The light transmitted to the central title block is metered by slit 16a. Two further openings 23 allow the diaphragm 15 to be fastened to the projections 20 of front panel 10.

The present invention is not to be restricted to the illustrated embodiments. For example, other light sources can be substituted for the incandescent lamps. Also, a plurality of light sources rather than just one may be arranged within the housing of indicator unit 12. Further, the light reflection from reflecting surface 18 of printed circuit board 19 can be increased by covering it with a lacquer or with white paint. The number, shape and size of apertures 16 is selected under consideration of the size and number of title blocks, the distance of the light source to the title block and the amount of indirect lighting.

Many other changes and modifications will be evident to one skilled in the art and are intended to be encompassed within the inventive concept.

We claim:

1. Apparatus for evenly illuminating a plurality of title blocks (11) on a front panel of a housing, comprising a light source (13) within the housing; and diaphragm means (15) positioned between said front panel and said light source, said diaphragm means having apertures (16) arranged in the region of said title blocks (11), the free area of said apertures being positioned for illumination of respectively associated title blocks and increasing in accordance with the size of the title blocks associated with any specific opening as well as with the distance from said light source (13) to the respective title blocks to provide for uniform illumination of said title blocks.

2. Apparatus as set forth in claim 1, wherein said diaphragm has a light-reflecting surface (17) facing said light source; and further comprising a second light-reflecting surface (18) positioned in the housing opposite said light-reflecting surface of said diaphragm and at a predetermined distance therefrom.

3. Apparatus as set forth in claim 2, wherein said light source is positioned between said second light-reflecting surface and said light-reflecting surface of said diaphragm.

4. Apparatus as set forth in claim 3, wherein said second light-reflecting surface is part of a printed circuit board (19) arranged in said housing.

5. Apparatus as set forth in claim 4, wherein said diaphragm and said printed circuit board are arranged in a direction parallel to said front panel; and wherein said diaphragm is arranged approximately equidistant between said front panel and said light source in the vicinity of said light source.

6. Apparatus as set forth in claim 1, wherein said apertures comprise pairs of slits (16b) arranged on each side of a title block.

7. Apparatus as set forth in claim 1, wherein said light source is an essentially point-source of light.

8. Apparatus as set forth in claim 1, wherein said light source is an incandescent light bulb.

9. Apparatus as set forth in claim 1, wherein the number of said apertures increases in accordance with the size of the title blocks and the distance to the light source.

10. Apparatus as set forth in claim 1, wherein the size of said apertures increases in accordance with the size of the title blocks and the distance to the light source.

11. Apparatus as set forth in claim 1, wherein the number and the size of said apertures increases in accordance with the size of the title blocks and the distance to the light source.

12. Apparatus as set forth in claim 9, wherein said light source is an incandescent light bulb.

13. Apparatus as set forth in claim 10, wherein said light source is an incandescent light bulb.

14. Apparatus as set forth in claim 11, wherein said light source is an incandescent light bulb.

15. Apparatus as set forth in claim 2, wherein the number and the size of said apertures increases in accordance with the size of the title blocks and the distance to the light source.

16. Apparatus as set forth in claim 15, wherein said light source is an incandescent light bulb.

* * * * *